United States Patent [19]

Muehlenbernd et al.

[11] Patent Number: 5,306,791
[45] Date of Patent: Apr. 26, 1994

[54] ETHYLENE HOMOPOLYMERS AND ETHYLENE COPOLYMERS AND A PROCESS FOR THEIR PREPARATION

[75] Inventors: Thomas Muehlenbernd, Tokyo, Japan; Roger Klimesch, Alsbach-Haehnlein, Fed. Rep. of Germany; Gernot Koehler, Meckenheim, Fed. Rep. of Germany; Ernst Fischer, Speyer, Fed. Rep. of Germany

[73] Assignee: BASF Aktiengesellschaft, Ludwigshafen, Fed. Rep. of Germany

[21] Appl. No.: 57,554

[22] Filed: May 6, 1993

Related U.S. Application Data

[62] Division of Ser. No. 950,508, Sep. 25, 1992, abandoned.

[30] Foreign Application Priority Data

Sep. 26, 1991 [DE] Fed. Rep. of Germany ....... 4132012

[51] Int. Cl.$^5$ .......................... C08F 4/28; C08F 10/02
[52] U.S. Cl. ....................................... 526/86; 526/87; 526/352
[58] Field of Search ..................... 526/86, 87

[56] References Cited

U.S. PATENT DOCUMENTS 5,100,978  3/1992  Hasenbein et al. .................. 526/86

Primary Examiner—Joseph L. Schofer
Assistant Examiner—David Wu
Attorney, Agent, or Firm—Keil & Weinkauf

[57] ABSTRACT

Novel ethylene homopolymers and ethylene copolymers which are suitable for film production and have a density from 925 to 940 kg/m$^3$, a melt flow index (MFI) of <1 g/10 min at 190° C. and at an applied force of 2.16 kp can be prepared by free radical polymerization of the monomers at from 500 to 5000 bar and reaction temperatures T of from 40° to 320° C. by means of an initiator with virtually complete exclusion of oxygen in at least n=3 polymerization stages. In the first stage, the total amount or the predominant part of the monomers is subjected to the polymerization by means of part of the required initiator until the polymerization virtually comes to a stop. A further part of the initiator and, if required, of the monomers is then added to the mixture cooled to 20°-60° C. This process is repeated in the subsequent stages until the n th stage, at least the initiators used in the n th stage having a half-life temperature of from 90° to 260° C., and that the maximum reaction temperature $T_{max}$ being 270° C. or higher, at least in the n th stage.

3 Claims, No Drawings

ETHYLENE HOMOPOLYMERS AND ETHYLENE COPOLYMERS AND A PROCESS FOR THEIR PREPARATION

This is a division of application Ser. No. 07/950,508, filed Sep. 25, 1992 now abandoned.

The invention relates to ethylene homopolymers and ethylene copolymers of predominant amounts of ethylene and minor amounts of comonomers polymerizable with ethylene, which can be prepared by free radical polymerization of the monomers at from 500 to 5000 bar and reaction temperatures T above 40° C. by means of an initiator with virtually complete exclusion of oxygen in at least n=3 polymerization stages and which have a density of from 925 to 940 kg /m³ and a melt flow index (MFI) of <1 g/10 min at 190° C. and at an applied force of 2.16 kp.

The present invention furthermore relates to a process for the preparation of these ethylene homopolymers and ethylene copolymers.

Ethylene homopolymers and ethylene copolymers and a process for their preparation are disclosed in EP-A-0 394 794. They are obtainable by free radical polymerization of the monomers at from 1500 to 5000 bar and reaction temperatures T of from 40° to 250° C. by means of an initiator with virtually complete exclusion of oxygen in at least n=3 polymerization stages. Here, in the first stage the total amount or the predominant part of the monomers is subjected to the polymerization by means of a part of the required initiator until the polymerization has virtually come to a stop. A further part of the initiator and, if required, the monomers are then added to the resulting mixture, cooled to 20°–60° C., and this process is repeated in the subsequent stages until the n th stage. With this known process, it is essential that the initiators used in the (n−1) th stage have a half-life temperature of from 80° to 160° C. However, these known ethylene homopolymers and ethylene copolymers have a comparatively low molecular weight and are readily flowing with melt flow indices of from 2.5 to 3.5 If it is intended to apply the process disclosed in EP-A-0 394 794 to the preparation of higher molecular weight, less readily flowing homopolymers and copolymers, explosive ethylene decompositions regularly occur in the reactors and prevent the polymerization being carried out safely and reliably.

EP-A-0 394 794 furthermore discloses that the n th polymerization stage can also be initiated by an initiator having a half-life temperature of up to 250° C. Tert-Butyl perbenzoate and methyl isobutyl ketone hydroperoxide are mentioned as examples.

However, the use of these initiators appears to be disadvantageous in view of Comparative Examples B and E of EP-A-0 394 794. For example, in the three-stage polymerization at maximum reaction temperatures of less than 240° C., the sole use of methyl isobutyl ketone hydroperoxide leads to ethylene homopolymers having a density of less than 925 kg /m³ and a melt flow index of 3.0 g/10 min. If, on the other hand, the initiators having a low half-life temperature are replaced by methyl isobutyl ketone hydroperoxide in the (n−1) th and the n th stages of a three-stage polymerization and the polymerization is carried out so that the maximum reaction temperatures $T_{max}$ are below 270° C., the resulting ethylene homopolymers only have densities of less than 921.5 kg /m³.

It is an object of the present invention to remedy the described disadvantages of the process disclosed in EP-A-0 394 794 and to prepare, at an acceptable cost in terms of apparatus and process engineering, ethylene homopolymers and ethylene copolymers having densities of from 925 to 940 kg /m³, a melt flow index (MFI) of <1 g/10 min at 190° C. and at an applied force of 2.16 kp and good optical properties with high conversion. In addition, these novel ethylene homopolymers and ethylene copolymers should give mechanically strong and highly extensible films possessing excellent optical properties.

We have found that this object is achieved in an elegant and economical manner if, in the final stage of a multistage polymerization, initiators having a half-life temperature of from 90° to 260° C. are used and the maximum reaction temperature $T_{max}$ is 270° C. or higher, at least in this final stage. In view of EP-A-0 394 794, it was not to be expected that it would be possible to achieve the object of the present invention with the aid of these two measures.

Accordingly, the present invention relates to ethylene homopolymers and ethylene copolymers having a density of from 925 to 940 kg/m³ and a melt flow index (MFI) of <1 g/10 min at 190° C. and at an applied force of 2.16 kp, which can be prepared b-y free radical polymerization of the monomers at from 500 to 5000 bar and reaction temperatures of from 40° to 320° C. by means of an initiator with virtually complete exclusion of oxygen in at least n=3 polymerization stages, wherein, in the first stage, the total amount or the predominant part of the monomers is subjected to polymerization by means of a part of the required initiator until the polymerization virtually comes to a stop, a further part of the initiator and, if required, of the monomers is then added to the mixture cooled to 20°–60° C., and this process is repeated in the subsequent stages up to the n th stage, with the provisos that at least the initiators used in the n th stage have a half-life temperature of from 90° to 260° C., and that the maximum reaction temperature $T_{max}$ is 270° C. or higher, at least in the n th stage.

For the sake of brevity, these novel ethylene homopolymers and ethylene copolymers are referred to below as novel polymers.

The process used for the preparation of the novel polymers can be employed both for the hompolymerization and for the copolymerization of ethylene with other monomers, provided that these monomers undergo free radical copolymerization with ethylene at high pressure. Examples of suitable copolymerization monomers are $\alpha,\beta$-ethylenically unsaturated $C_3$-$C_8$-carboxylic acids, in particular maleic acid, fumaric acid, itaconic acid, acrylic acid, methacrylic acid and crotonic acid, $\alpha,\beta$-ethylenically unsaturated $C_4$-$C_{15}$-carboxylic esters or anhydrides, in particular methyl methacrylate, ethyl acrylate, n-butyl acrylate, methacrylic anhydride, maleic anhydride and itaconic anhydride. The comonomer content of the novel copolymers should not exceed 40, in particular 20, % by weight.

The polymerization is carried out at from 500 to 5,000, advantageously from 1500 to 3500, bar. The reaction temperatures T are above 40° C. It is advantageous if the reaction temperatures T do not exceed 320° C., in particular 300° C.

In its first stage, the polymerization is initiated by adding free radical initiators. Examples of suitable initiators are organic peroxides, such as peroxyesters, peroxyketones, peroxyketals and peroxycarbonates, azodicarboxylic esters, azodicarboxylic dinitriles and hydrocarbons which decompose to give free radicals and are also referred to as C—C initiators.

Examples of suitable inititators are di-2-ethylhexyl peroxydicarbonate, dicyclohexyl peroxydicarbonate, diacetyl peroxydicarbonate, cumyl perneodecanoate, tertamyl perpivalate, tert-butyl perneodecanoate, tert-butyl permaleate, tert-butyl perpivalate,, tert-butyl perisononanoate, diisopropylbenzene hydroperoxide, cumyl hydroperoxide, tert-butyl perbenzoate, methyl isobutyl ketone hydroperoxide, 2,2-bis-(tert-butylperoxy)-butane, azobisisobutyronitrile and 1,2-diphenyl-1,2-dimethylethane derivatives and 1,1,2,2-tetramethylethane derivatives. The initiators can be used individually or as a mixture in concentrations of from 0.5 to 100, in particular from 0.5 to 50, ppm/h, based on the amount of monomers. It is advantageous to use the initiators in the dissolved state. Examples of suitable solvents are aliphatic hydrocarbons, in particular octane and isodecane.

According to the invention, it is advantageous to use, for the first stage of the polymerization, initiators which have a half-life temperature of from 80° to 160° C. The half-life temperature is the temperature at which half of the initiator, dissolved in benzene, decomposes within one minute. Tert-Butyl perpivalate and tert-butyl perisononanoate proved to be particularly advantageous and are therefore very particularly preferably used.

For the process for the preparation of the novel polymers it is essential that at least the initiators used in the final, i.e. n th, stage have a half-life temperature of from 90° to 260° C. Examples of suitable initiators having these half-life temperatures are diisapropylbenzyl hydroperoxide, cumyl hydroperoxide, tert-butyl perbenzoate, methyl isobutyl ketone hydroperoxide, 2,2-bis-(tert-butylperoxy)-butane and 2,3-dimethyl-2,3-diphenylbutane, of which methyl isobutyl ketone hydroperoxide is particularly advantageous and is therefore very particularly preferably used.

In the process for the preparation of the novel polymers, their molecular weight can be controlled as usual by adding regulators. Examples of suitable regulators are aliphatic hydrocarbons, ketones and aldehydes, of which propionaldehyde is particularly advantageous and is therefore very particularly preferably used.

The process for the preparation of the novel polymers is carried out with virtually complete exclusion of oxygen in three or more successive stages, and the polymerization must be reinitiated in each stage by adding the corresponding initiators. Inter alia, tube reactors which are provided with a number of inlet points for the initiator and, if required, for feeding further amounts of monomers are suitable for the procedure. In general, the tube reactor has a ratio of length to diameter of not less than 1,000, preferably more than 2,000, with a length of 150 to 1,000 m. The tube reactor is advantageously arranged in coil form. The heat of reaction evolved during the polymerization is generally removed from the outside by cooling the reactor wall with water. If necessary, a reactor with back-mixing, in particular a stirred autoclave, may also be present upstream of the tube reactor. In this case, it is possible to cool the mixtrue emerging from the stirred reactor with the aid of a heat exchanger before said mixture enters the tube reactor. As a rule, however, the process is carried out without a heat exchanger. The reactors used in the process generally contain a number of temperature measuring apparatuses in the interior of the reactor so that the temperature variation during the polymerization can be observed.

It is important for the process for the preparation of the novel polymers that the maximum reaction temperature $T_{max}$ is 270° C. or higher, at least in the final, i.e. the n th, stage of the polymerization. $T_{max}$ should not in general exceed 320° C., in particular 300° C.

In a preferred embodiment of the process for the preparation of the novel polymers, the reaction mixture of ethylene and a regulator and, if required, one or more comonomers is first compressed to more than 500, in particular 1500, bar, heated to above 100° C. and then fed together with part of the initiator into a tube reactor where the polymerization is rapidly initiated after decomposition of the initiator. Cooling of the reactor was adjusted so that the $T_{max}$ of 320° C. is not exceeded in the interior of the tube from the first to the penultimate, i.e. $(n-1)$ th, stage. After only a short time, the temperature profile dependent on the conversion in the polymerization is established along the tube reactor. Cessation of the reaction is indicated by a decrease in the temperature inside the tube. When a temperature of about 20° to 60° C. below $T_{max}$ is reached, the polymerization is initiated again by adding further amounts of initiator. This causes the temperature initially to increase substantially again, and suitable cooling measures must be taken to ensure that $T_{max}$ is in the desired range. By feeding in further initiators, this process can be repeated along the reaction tube as often as desired (n times). As a result, a number of different polymerization stages occur in the reactor, all of which have a certain maximum temperature $T_{max}$. For the process for the preparation of the novel polymers, it is essential that the polymerization is effected in three or more stages.

In the process for the preparation of the novel polymers, the initiator as well as either cold or preheated ethylene and/or cold or preheated comonomers can be added to the reaction mixture at the same place or at a separate place.

In general, the mean residence time of the reaction mixture in the tube reactor is from 30 to 300, in particular from 30 to 120, seconds.

After the reaction mixture has been discharged, the novel polymer is separated from unused ethylene and, where relevant, unused comonomers by letting down the pressure, after which the monomers are generally recycled to the reactor.

This process for the preparation of the novel polymers can also be carried out in a similar manner in a reactor with back-mixing and a downstream tube reactor. In this case, $T_{max}$ in the reactor with back-mixing should not exceed 230° C. After the polymerization has ceased, the polymerization mixture together with unconsumed monomers are passed through a high pressure tube, which may also be connected to a heat exchanger, into a tube reactor where the process as described above is continued. In general, the mean residence time of the mixture in the reactor with back-mixing is from 10 to 100, in particular from 10 to 30, seconds and that in the tube reactor is from 10 to 200, in particular 10 to 100, seconds.

In this way it is possible to prepare the novel polymers safely and exactly reproducibly without explosive decomposition of the ethylene occurring in the reactors. The novel polymers have densities of 925 to 940 kg/m$^3$. Their melt flow index according to DIN 53,735 is less than 1, in particular less than 0.5, g/10 min. Films produced from the novel polymers have good splicing properties and excellent optical properties. This is evident in particular from the relatively low light scattering (according to DIN 53,490) and the increased gloss values (according to DIN 67,530). Novel polymers having densities above 925 kg /m³ and conversions of more than 25% can be prepared in th& manner described above. Another advantage is that it is possible to use the reactors customary in high pressure technology, i.e. it is not necessary to rely on, for example, reactors having changing cross-sections, which are referred to as telescope reactors, and the process can be carried out without particular technical complications. In contrast to the process of DE-A-27 48 263, novel polymers are also obtained when the reaction mixture close to the reactor has flow rates substantially smaller than 0.307 m²/sec. Not least, however, the novel polymers have excellent mechanical properties, which are evident from their high elongation at break and penetration strength and the dart drop impact values (DDI) measured according to ASTM D-1709-A.

EXAMPLES AND COMPARATIVE EXPERIMENTS

Examples 1 to 7 and Comparative Experiments A and B were carried out in a tubular reaction vessel having a length of 560 m and a ratio of length to diameter of 37,000. The polymerization initiators, dissolved in aliphatic hydrocarbons, were fed by means of high pressure piston pumps directly to the feed points of the tube reactor. The position of the feed points defined the position of the reaction zones in the reaction vessel. The oxygen-free ethylene was compressed to the particular reaction pressure in a plurality of stages, a molecular weight regulator was added and the mixture was fed to the inlet points of the tube reactor. The molecular weight regulator used was propionaldehyde or propane.

The heat of reaction evolved in the polymerization was removed from the reaction mixture by a coolant circulation fed with steam. The resulting polymer was separated from unconverted ethylene and other low molecular weight compounds in a conventional manner in the separators downstream of the reactor and were discharged via an extruder and granulator and compounded. Unconverted ethylene was purified in a plurality of stages and recycled to the suction side of the compressor.

The performance characteristics of the resulting polymers were determined by the following methods:
  The melt flow index (MFI) at 190° C. and at an applied force of 2.16 kp according to DIN 53,735;
  the density according to DIN 53,479.

The polymers were converted in a conventional manner into blown films, whose performance characteristics were determined by the following methods:
  The light scattering of the film according to DIN 53,490
  The gloss of the film according to DIN 67,530
  The elongation at break of the film according to DIN 53,455
  The penetration strength of the film according to DIN 53,373
  The dart drop impact according to ASTM D-1709-A.
  The drawing capacity of the blown film was determined in a conventional manner in the production of the relevant film by extrusion, film blowing, take-off of the film and winding. The take-off speed with which the blown film was taken off from the blowing apparatus was increased stepwise until the film tore.

EXAMPLE 1

The preparation of a novel ethylene homopolymer and further processing thereof to give a blown film 1.7 l/h of propionaldehyde were added to 3.2 t/h of ethylene and the mixture was compressed to 3,000 bar, heated to 140° C. in a preheater and fed to the entrance of a tube reactor. 8 ppm/h of tert-butyl perpivalate and 15 ppm/h of tert-butyl perisononanoate, dissolved in isodecane, were fed to the inlet point of the reactor. The polymerization was initiated in this manner. 23 ppm/h of tert-butyl perisononanoate were fed to the second feed point of the tube reactor, at which the reaction temperature had fallen to 220° C. after the first temperature measurement, and 12 ppm/h of tert-butyl perisononanoate and 5 ppm/h of methyl isobutyl ketone hydroperoxide were fed to the third feed point, at which the second temperature maximum had fallen off. In the first two polymerization stages, $T_{max}$ was less than 265° C.; in the third stage, $T_{max}$ was 295° C.

The resulting novel ethylene homopolymer was freed from ethylene and low molecular weight compounds in a conventional manner in high and low pressure separators, stored in bins and processed to give blown films.

Table 1 provides information about the conversion of the reaction, the physiochemical properties of the novel ethylene hompolymer and the performance characteristics of the blown film produced therefrom. Owing to its excellent optical and mechanical properties, the novel ethylene homopolymer was very suitable for the production of heavy duty packaging and small hollow articles and for the production of cable sheaths for low voltage cable.

EXAMPLE 2

The preparation of a novel ethylene homopolymer and further processing thereof to give a blown film 2.5 m³(S T.P.)/h of propane were added to 3.2 t/h of ethylene and the mixture was compressed to 3,000 bar, a tube reactor. In addition 9 ppm/h of tert-butyl peroxypivalate and 17 ppm/h of tert-butyl peroxyisononanoate dissolved in isodecane, were fed to the inlet point of the reactor. The polymerization was initiated in this manner.

25 ppm/h of tert-butyl perisononanoate were fed to the second feed point of the tube reactor, at which the reaction temperature had fallen to 220° C. after the first temperature measurement, and 14 ppm/h of tert-butyl perisononanoate and 6 ppm/h of methyl isobutyl ketone hydroperoxide were fed to the third feed point, at which the second temperature maximum had fallen off. In the first two stages, $T_{max}$ was less than 265° C.; in the third stage, $T_{max}$ was 280° C.

The resulting polymer was isolated, stored, investigated and further processed as in Example 1. The conversion in the reaction; the density, the melt flow index and the performance characteristics of the blown film produced therefrom are also shown in the Table.

As in Example 1, the reaction procedure presented no difficulties at all and furthermore the feared explosive decomposition of ethylene did not occur. Owing to its excellent mechanical and optical properties, the novel ethylene homopolymer was very suitable for the production of high tension cable sheaths, heavy duty packaging, small hollow articles for the medical sector and laminated films.

EXAMPLE 3

The preparation of a novel ethylene homopolymer and further processing thereof to give a blown film 1.5 l/h of propionaldehyde and 5,000 ppm/h of n-butyl acrylate were added to 3.2 t/h of ethylene and the mixture was compressed to 3,000 bar, heated to 140° C. in a preheater and fed to the entrance of a tube reactor. 8 ppm/h of tert-butyl perpivalate and 15 ppm/h of tert-butyl perisononanoate dissolved in isodecane, were fed to the inlet point of the reactor. The polymerization was initiated in this manner.

22 ppm/h of tert-butyl perisononanoate were fed to the second feed point of the tube reactor, at which the reaction temperature had fallen to 220° C. after the first temperature measurement, and 10 ppm/h of methyl isobutyl ketone hydroperoxide were fed to the third feed point, at which the second temperature maximum had fallen off. In the first two polymerization stages, the maximum reaction temperatures $T_{max}$ was less than 265° C.; in the third stage, $T_{max}$ was 290° C.

The resulting novel ethylene homopolymer was isolated, stored, investigated and further processed as in Examples 1 and 2.

The data relating to the present Example are likewise shown in the Table. They underline the advantageous properties of the novel polymers: the novel ethylene homopolymer of Example 3 was very suitable for all intended uses stated in Examples 1 and 2.

EXAMPLE 4

The preparation of a novel ethylene hompolymer and further processing thereof to give a blown film 0.85 l/h of propionaldehyde was added to 1.6 t/h of ethylene and the mixture was compressed to 3,000 bar, heated to 140° C. in a preheater and fed to the entrance of a tube reactor. 3.5 ppm/h of tert-butyl perpivalate and 7 ppm/h of tert-butyl perisononanoate, dissolved in isodecane, were fed to the inlet point of the reactor. The polymerization was initiated in this manner. At the second feed point of the tube reactor, at which the reaction temperature had decreased again to 240° C., the reaction mixture was cooled by feeding in 1.6 t/h of ethylene which had been preheated, mixed with 0.85 l/h of propionaldehyde and compressed to 3,000 bar, and 6 ppm/h of tert-butyl perpivalate and 12 ppm/h of tert-butyl perisononanoate, dissolved in isodecane, were added to the reaction mixture. After the second reaction zone had been passed through and the temperature had decreased to 220° C., a mixture of 13 ppm/h of tert-butyl perisononanoate and 6 ppm/h of methyl isobutyl ketone hydroperoxide was fed in at the third feed point, with the result that a subsequent reaction was initiated. $T_{max}$ of the first and second stages were below 265° C.; $T_{max}$ of the third stage was 280° C.

The resulting novel ethylene homopolymer was isolated, stored, investigated and further processed as described in Examples 1 to 3. The relevant data are likewise shown in the Table. They show that even the novel polymer of Example 4 had excellent performance characteristics and was very suitable for all intended uses stated in the preceding Examples.

EXAMPLE 5

The preparation of a novel ethylene hompolymer and further processing thereof to give a blown film 1.3 m³(S.T.P.)/h of propane were added to 1.6 t/h of ethylene and the mixture was compressed to 3,000 bar, heated to 145° C. in a preheater and fed to the entrance of a tube reactor. In addition, 4 ppm/h of tert-butyl perpivalate and 8 ppm/h of tert-butyl perisononanoate, dissolved in isodecane, were fed to the inlet point of the reactor. The polymerization was initiated in this manner.

At the second feed point of the tube reactor, at which the reaction temperature had decreased to 240° C. after the first temperature maximum $T_{max}$, the reaction mixture was cooled by feeding in 1.6 t/h of ethylene which had been preheated to 125° C., mixed with 1.3 m³(S.T.P)/h of propane and compressed to 3,000 bar, and 2 ppm/h of tert-butyl perpivalate and 11 ppm/h of tert-butyl perisononanoate, dissolved in isodecane, were added to the reaction mixture. After the second reaction zone had been passed through and the temperature had decreased to 220° C., a mixture of 14 ppm/h of tert-butyl perisononanoate and 7 ppm/h of methyl isobutyl ketone hydroperoxide, dissolved in isodecane, was fed to the third initiator feed point, an a subsequent reaction was initiated in this manner. The temperature maxima $T_{max}$ of the first two polymerization stages were below 265° C.; $T_{max}$ of the third polymerization stage on the other hand was 285° C.

The novel ethylene homopolymer prepared in this manner was isolated, stored, investigated and further processed as described in the preceding Examples. The relevant data are likewise shown in the Table. They provide further confirmation of the advantageous properties of the novel polymers: as in the case of the novel polymers of Examples 1 to 4, those of Example 5 are suitable for all intended uses stated, particularly in the medical sector. In carrying out the polymerization reaction itself, no ethylene decomposition at all was observed, as in the preceding Examples.

EXAMPLE 6

The preparation of a novel ethylene hompolymer and further processing thereof to give a blown film 5,000 ppm/h of n-butyl acrylate and 9.75 l/h of propionaldehyde were added to 1.6 t/h of ethylene and the mixture was compressed to the reaction pressure of 3,000 bar, heated to 140° C. in a preheater and fed to the entrance of a tube reactor. In addition, 3 ppm/h of tert-butyl perpivalate and 7 ppm/h of tert-butyl perisononanoate, dissolved in isodecane, were fed to the inlet point of the reactor. The polymerization was initiated in this manner.

At the second feed point of the tube reactor, at which the temperature had decreased to 240° C. after the first temperature maximum $T_{max}$ the reaction mixture was cooled by feeding in 1.6 t/h of ethylene which had been preheated to 180° C., mixed with 5,000 ppm/h of n-butyl acrylate and 0.75 l/h of propionaldehyde, compressed to 3,000 bar, and 2 ppm/h of tert-butyl perpivalate and 10 ppm/h of tert-butyl perisononanoate, dissolved in isodecane, were added to the reaction mixture. After the second reaction zone had been passed through and the temperature had decreased again to 220° C., a mixture of 12 ppm/h of tert-butyl perisononanoate and 6 ppm/h of methyl isobutyl ketone hydroperoxide, dissolved in isodecane, was fed to the third initiator feed point, with the result that a subsequent reaction was initiated. The maximum reaction temperatures $T_{max}$ of the first and of the second reaction zones were below 260° C.; $T_{max}$ of the third polymerization stage on the other hand was 280° C.

The novel polymer obtained in this manner was isolated, stored, investigated and further processed as described in the preceding Examples. The relevant data are shown in the Table. They confirm that even this novel polymer had the same excellent performance characteristics as the novel polymers of Examples 1 to 5.

EXAMPLE 7

The preparation of a novel ethylene hompolymer and further processing thereof to give a blown film Example 1 was repeated, except that the C—C initiator 2,3-dimethyl-2,3-diphenylbutane was used instead of methyl isobutylketone hydroperoxide. This initiator was metered in at the second feed point in an amount of 2 ppm/h, in isodecane, and at the third feed point in an amount of 3.5 ppm/h. The resulting novel ethylene homopolymer was isolated, stored, investigated and further processed as in the preceding Examples. The relevant data are likewise shown in the Table. They clearly show that the novel polymer of Example 8 is very suitable for all intended uses stated in the preceding Examples. Regarding the procedure in the process, there is also no ethylene decomposition owing to the use of the C—C initiator.

COMPARATIVE EXPERIMENT A

The preparation of a known ethylene copolymer and further processing thereof to give a blown film Comparative Example B of EP-A-0 394 794 was repeated. For this purpose, 2.3 t/h of ethylene together with 2 l/h of propionaldehyde were compressed to 2,800 bar in a high pressure compressor, heated to 145° C. and fed into a tube reactor. The polymerization was initiated by adding 4.8 ppm/h of tert-butyl perpivalate and 3.8 ppm/h of methyl isobutyl ketone hydroperoxide, which were added to the monomers at the inlet point of the tube reactor. After the temperature maximum $T_{max}$ had fallen off and the reaction had ceased, the polymerization was reinitiated each time by two additions of 3.4 ppm/h of tert-butyl perpivalate in each case and by a single addition of 2.2 ppm/h of methyl isobutyl ketone hydroperoxide, so that a total of four temperature maximum $T_{max}$ formed, none of which exceeded 240° C. Otherwise, the resulting known ethylene homopolymer was isolated, stored, investigated and further processed as in Examples 1 to 8. The relevant data are compared in the Table with the data of the novel ethylene homopolymers. The data show that the known ethylene homopolymer had a lower density and a higher melt flow index than the novel polymer. Furthermore, in the form of a film it had substantially poorer performance characteristics than the films of Examples 1 to 8.

COMPARATIVE EXPERIMENT B

For Comparative Experiment B, Comparative Example E of EP-A-0 394 794 was repeated. For this purpose, 1.4 t/h of ethylene together with 1.4 l/h of propionaldehyde were compressed to 2,800 bar in a high pressure compressor and fed at a gas inlet temperature of 30° C. to a stirred autoclave. The polymerization was initiated by 10.4 ppm/h of tert-butyl perpivalate, and the contents of the autoclave were mixed thoroughly with the aid of a stirrer at a speed of 1,300 rpm. The mean residence time was 25 seconds. In the autoclave the temperature maximum $T_{max}$ was 211° C.

The reaction mixture was then fed via an insulated high pressure pipe into the tube reactor. 1.65 ppm/h of methyl isobutyl ketone hydroperoxide were added at the inlet point. After the temperature maximum $T_{max}$ had fallen off and the polymerization had ceased, the latter was initiated again by 1.15 ppm/h of methyl isobutyl ketone hydroperoxide. This resulted in a total of two temperature maxima $T_{max}$ in the tube reactor, both of which were below 270° C.

The resulting known ethylene homopolymer was worked up, stored, investigated and further processed as described in Comparative Example A. The data obtained were compared with those of Examples 1 to 8 in the Table. Comparison of the data confirms how disadvantageous the known process is. In particular, an ethylene homopolymer which has a density of less than 921.5 kg/m³ is obtained.

TABLE

The preparation and the properties of novel (Examples 1 to 7) and known (Comparative Experiments A and B) ethylene polymers and the performance characteristics of the blown films produced therefrom

| Example No. | Density[a] (kg/cm³) | Conversion (based on ethylene) (%) | MFI[b] (g/10 min) | Scattered light[c] (%) | Gloss[d] at 20° C. % | Elongation at break, longitudinal[e] (%) | Drawing capacity[f] (μm) | Penetration strength[g] (J·mm⁻¹) | Drop dart impact test[h] (g) |
|---|---|---|---|---|---|---|---|---|---|
| 1 | 930.4 | 28.2 | 0.29 | 14 | 65 | 400 | 16 | 6.5 | 200 |
| 2 | 931.0 | 27.5 | 0.28 | 16 | 55 | 405 | 17 | 6.0 | 200 |
| 3 | 926.0 | 28.1 | 0.28 | 18 | 66 | 280 | 21 | 7.9 | 270 |
| 4 | 929.5 | 30.0 | 0.28 | 15 | 55 | 380 | 19 | 6.8 | 210 |
| 5 | 928.7 | 28.5 | 0.29 | 12 | 68 | 500 | 18 | 6.7 | 200 |
| 6 | 926.5 | 29.4 | 0.27 | 22 | 62 | 280 | 25 | 8.1 | 265 |
| 7 | 926.8 | 24.0 | 0.29 | 23 | 60 | 330 | 24 | 6.8 | 190 |
| Comp. Expt. | | | | | | | | | |
| A | 923.5 | 25.7 | 3.0 | 22 | 33 | 190 | 30 | 4.8 | 100 |

TABLE-continued

The preparation and the properties of novel (Examples 1 to 7) and known (Comparative Experiments A and B) ethylene polymers and the performance characteristics of the blown films produced therefrom

| Example No. | Density[a] (kg/cm$^3$) | Conversion (based on ethylene) (%) | MFI[b] (g/10 min) | Scattered light[c] (%) | Gloss[d] at 20° C. % | Elongation at break, longitudinal[e] (%) | Drawing capacity[f] (μm) | Penetration strength[g] (J·mm$^{-1}$) | Drop dart impact test[h] (g) |
|---|---|---|---|---|---|---|---|---|---|
| B | 921.5 | 27.8 | 2.8 | 21 | 43 | 200 | 35 | 5.1 | 120 |

Legend for Table:
[a] determined according to DIN 53,479;
[b] melt flow index at 190° C. and at an applied force of 2.16 kp, determined according to DIN 53,735;
[c] determined according to DIN 53,490;
[d] determined according to DIN 67,530 at an angle of 20°;
[e] determined according to DIN 53,455;
[f] determined from the variation of the take-off speed during film production;
[g] determined according to DIN 53,373;
[h] determined according to ASTM-D-1709-A

We claim:

1. A process for the preparation of an ethylene homopolymer or ethylene copolymer by polymerizing the relevant monomers at from 500 to 5000 bar and reaction temperatures T from 40° C. to 320° C. by means of an initiator with virtually complete exclusion of oxygen in at least n=3 polymerization stages, in which, in the first stage, the total amount or the predominant part of the monomers is subjected to the polymerization by means of a part of the required initiator until the polymerization virtually comes to a stop, a further part of the initiator and, if required, of the monomers is added to the mixture cooled to 20°-60° C. and this process is repeated in the subsequent stages until the n th stage, with the proviso that the initiators used in the n th stage have a half-life temperature of from 90° to 260° C., wherein the reaction temperature T is 40° to 320° C. and the maximum reaction temperature $T_{max}$ is from 270° C. to 320° C. in the n th stage.

2. The process of claim 1, wherein the polymerization reaction is carried out at from 1500 to 3500 bar.

3. The process of claim 1, wherein the reaction temperature T is from 40° to 300° C.

* * * * *